US00RE42968E

(19) United States
(12) Reissued Patent
Sheehan et al.

(10) Patent Number: US RE42,968 E
(45) Date of Reissued Patent: Nov. 29, 2011

(54) FIBROUS STRUCTURE PRODUCT WITH HIGH SOFTNESS

(75) Inventors: Jeffrey Glen Sheehan, Cincinnati, OH (US); Markus Wilhelm Altmann, Cincinnati, OH (US); Osman Polat, Montgomery, OH (US); Robert Stanley Ampulski, Fairfield, OH (US)

(73) Assignee: the Procter & Gamble Company, Cincinnati, OH (US)

(21) Appl. No.: 13/048,002

(22) Filed: Mar. 15, 2011

Related U.S. Patent Documents

Reissue of:
(64) Patent No.: 7,744,723
Issued: Jun. 29, 2010
Appl. No.: 11/799,732
Filed: May 2, 2007

U.S. Applications:
(60) Provisional application No. 60/797,244, filed on May 3, 2006.

(51) Int. Cl.
*D21H 27/00* (2006.01)
*D04H 13/00* (2006.01)
*B32B 5/00* (2006.01)

(52) U.S. Cl. ..... 162/123; 162/111; 162/117; 162/158; 162/179; 428/156; 428/172

(58) Field of Classification Search ..... 162/109, 162/117, 123–133, 204–206, 111–113, 158, 162/179; 428/153, 156, 172, 340
See application file for complete search history.

(56) References Cited

U.S. PATENT DOCUMENTS

| | | | | | |
|---|---|---|---|---|---|
| D154,696 | S | * | 8/1949 | Mitschke | D5/37 |
| 2,624,245 | A | * | 1/1953 | Cluett | 162/206 |
| 3,011,545 | A | * | 12/1961 | Welsh et al. | 162/361 |
| 3,260,778 | A | * | 7/1966 | Walton | 264/282 |
| 3,301,746 | A | * | 1/1967 | Sisson et al. | 162/113 |
| 3,329,556 | A | * | 7/1967 | McFalls et al. | 442/352 |
| 3,359,156 | A | * | 12/1967 | Freuler et al. | 162/361 |
| 3,414,459 | A | * | 12/1968 | Wells | 428/180 |
| 3,416,192 | A | * | 12/1968 | Packard | 425/374 |
| 3,426,405 | A | * | 2/1969 | Walton | 26/18.6 |
| 3,537,954 | A | * | 11/1970 | Justus | 162/305 |
| 3,554,863 | A | * | 1/1971 | Hervey et al. | 162/158 |
| 3,629,056 | A | * | 12/1971 | Forrest | 162/305 |
| 3,630,837 | A | * | 12/1971 | Freuler | 162/361 |
| 3,692,622 | A | * | 9/1972 | Dunning | 428/171 |
| 3,726,750 | A | * | 4/1973 | Stillings | 428/198 |
| 3,776,807 | A | * | 12/1973 | Dunning et al. | 428/170 |
| 3,806,406 | A | * | 4/1974 | Ely | 162/206 |
| 3,812,000 | A | * | 5/1974 | Salvucci, Jr. et al. | 162/111 |
| 3,821,068 | A | * | 6/1974 | Shaw | 162/111 |
| 3,846,228 | A | * | 11/1974 | Ely et al. | 162/206 |
| 3,905,863 | A | * | 9/1975 | Ayers | 162/113 |
| 3,926,716 | A | * | 12/1975 | Bates | 162/113 |
| 3,974,025 | A | * | 8/1976 | Ayers | 162/113 |
| 3,994,771 | A | * | 11/1976 | Morgan et al. | 162/113 |
| 4,072,557 | A | * | 2/1978 | Schiel | 162/111 |
| 4,090,385 | A | * | 5/1978 | Packard | 72/191 |
| 4,100,017 | A | * | 7/1978 | Flautt, Jr. | 162/111 |
| 4,102,737 | A | * | 7/1978 | Morton | 162/113 |
| 4,120,747 | A | * | 10/1978 | Sarge et al. | 162/117 |
| 4,125,430 | A | * | 11/1978 | Grossman | 162/207 |
| 4,125,659 | A | * | 11/1978 | Klowak et al. | 428/153 |
| 4,127,637 | A | * | 11/1978 | Pietreniak et al. | 264/119 |
| 4,144,122 | A | * | 3/1979 | Emanuelsson et al. | 162/158 |
| 4,157,938 | A | * | 6/1979 | Clemens et al. | 162/207 |
| 4,191,609 | A | * | 3/1980 | Trokhan | 162/113 |
| 4,191,756 | A | * | 3/1980 | Masi et al. | 514/34 |
| 4,196,045 | A | * | 4/1980 | Ogden | 162/117 |
| 4,225,382 | A | * | 9/1980 | Kearney et al. | 162/111 |
| 4,300,981 | A | * | 11/1981 | Carstens | 162/109 |
| 4,309,246 | A | * | 1/1982 | Hulit et al. | 162/113 |
| 4,351,669 | A | * | 9/1982 | Nielsen | 106/2 |
| 4,440,597 | A | * | 4/1984 | Wells et al. | 162/111 |
| 4,448,638 | A | * | 5/1984 | Klowak | 162/112 |
| 4,464,224 | A | * | 8/1984 | Matolcsy | 162/111 |
| 4,469,735 | A | * | 9/1984 | Trokhan | 428/154 |
| 4,488,932 | A | * | 12/1984 | Eber et al. | 162/9 |
| 4,514,345 | A | * | 4/1985 | Johnson et al. | 264/425 |
| 4,528,239 | A | * | 7/1985 | Trokhan | 442/33 |
| 4,529,480 | A | * | 7/1985 | Trokhan | 162/109 |
| 4,551,199 | A | * | 11/1985 | Weldon | 162/109 |
| 4,556,450 | A | * | 12/1985 | Chuang et al. | 162/204 |
| 4,586,606 | A | * | 5/1986 | Howey | 206/313 |
| 4,637,859 | A | * | 1/1987 | Trokhan | 162/109 |

(Continued)

FOREIGN PATENT DOCUMENTS

| | | | | |
|---|---|---|---|---|
| EM | 617164 | B1 | * | 8/1997 |
| EM | 631014 | B1 | * | 10/1997 |
| EM | 806520 | A1 | * | 11/1997 |
| EM | 568404 | B1 | * | 12/1997 |
| EM | 938609 | B1 | * | 3/2003 |
| EP | 0 342 646 | B1 | | 11/1989 |
| EP | 0 617 164 | B1 | | 8/1997 |
| EP | 0 631 014 | B1 | | 10/1997 |
| EP | 0 806 520 | A1 | | 11/1997 |
| EP | 0 568 404 | B1 | | 12/1997 |
| EP | 0 938 609 | B1 | | 3/2003 |
| GB | 1 212 473 | | | 11/1970 |
| GB | 1212473 | A | * | 8/1975 |
| GB | 1 533 045 | | | 11/1978 |
| GB | 1533045 | A | * | 11/1978 |
| GB | 2001370 | A | * | 1/1979 |
| GB | 2006296 | A | * | 5/1979 |
| GB | 2303647 | A | * | 2/1997 |
| GB | 2304123 | A | * | 3/1997 |
| JP | 05023262 | A | * | 2/1993 |

(Continued)

OTHER PUBLICATIONS

International Search report dated Jan. 7, 2008.*
U.S. Appl. No. 11/799,639, filed May 2, 2007, Sheehan, et al.*
Horn, et al., "Fiber Morphology and New Crops", Timber Press, pp. 270-275 (1990).*

*Primary Examiner* — José A Fortuna
(74) *Attorney, Agent, or Firm* — Roddy Bullock

(57) ABSTRACT

A multiply fibrous structure product having two or more plies of fibrous structure wherein the fibrous structure has a Compression Slope from about 11 to about 30; a basis weight from about 26 lbs/3000 $ft^2$ to about 50 lbs/3000 $ft^2$; a Wet Caliper greater than about 18 mils; and a Flex Modulus from about 0.1 to about 0.8.

40 Claims, 2 Drawing Sheets

U.S. PATENT DOCUMENTS

| | | | | | |
|---|---|---|---|---|---|
| 4,671,983 | A | * | 6/1987 | Burt | 428/179 |
| 4,808,266 | A | * | 2/1989 | Faurie | 162/102 |
| 4,849,054 | A | * | 7/1989 | Klowak | 162/109 |
| 4,940,513 | A | * | 7/1990 | Spendel | 162/112 |
| 4,959,125 | A | * | 9/1990 | Spendel | 162/158 |
| 5,048,589 | A | * | 9/1991 | Cook et al. | 162/109 |
| 5,059,282 | A | * | 10/1991 | Ampulski et al. | 162/111 |
| 5,098,519 | A | * | 3/1992 | Ramasubramanian et al. | 162/109 |
| 5,098,522 | A | * | 3/1992 | Smurkoski et al. | 162/358.2 |
| 5,102,501 | A | * | 4/1992 | Eber et al. | 162/129 |
| 5,126,015 | A | * | 6/1992 | Pounder | 162/206 |
| 5,129,988 | A | * | 7/1992 | Farrington, Jr. | 162/123 |
| 5,245,025 | A | * | 9/1993 | Trokhan et al. | 536/56 |
| 5,275,700 | A | * | 1/1994 | Trokhan | 162/358.1 |
| 5,328,565 | A | * | 7/1994 | Rasch et al. | 162/113 |
| 5,334,289 | A | * | 8/1994 | Trokhan et al. | 162/358.2 |
| 5,348,620 | A | * | 9/1994 | Hermans et al. | 162/9 |
| 5,364,504 | A | * | 11/1994 | Smurkoski et al. | 162/116 |
| 5,397,435 | A | * | 3/1995 | Ostendorf et al. | 162/112 |
| 5,399,412 | A | * | 3/1995 | Sudall et al. | 428/153 |
| 5,411,636 | A | * | 5/1995 | Hermans et al. | 162/109 |
| 5,429,686 | A | * | 7/1995 | Chiu et al. | 139/383 A |
| 5,437,766 | A | * | 8/1995 | Van Phan et al. | 162/127 |
| D362,967 | S | * | 10/1995 | Rothwell et al. | D5/53 |
| 5,458,950 | A | * | 10/1995 | Bredenick et al. | 428/154 |
| 5,501,768 | A | * | 3/1996 | Hermans et al. | 162/9 |
| 5,527,428 | A | * | 6/1996 | Trokhan et al. | 162/116 |
| 5,556,509 | A | * | 9/1996 | Trokhan et al. | 162/111 |
| 5,573,830 | A | * | 11/1996 | Schulz | 428/156 |
| 5,591,309 | A | * | 1/1997 | Rugowski et al. | 162/283 |
| 5,593,545 | A | * | 1/1997 | Rugowski et al. | 162/207 |
| 5,601,871 | A | * | 2/1997 | Krzysik et al. | 427/288 |
| 5,607,551 | A | * | 3/1997 | Farrington et al. | 162/109 |
| 5,616,207 | A | * | 4/1997 | Sudall et al. | 156/246 |
| 5,620,776 | A | * | 4/1997 | Schulz | 428/156 |
| 5,628,876 | A | * | 5/1997 | Ayers et al. | 162/358.2 |
| 5,629,052 | A | * | 5/1997 | Trokhan et al. | 427/508 |
| 5,637,194 | A | * | 6/1997 | Ampulski et al. | 162/109 |
| D382,162 | S | * | 8/1997 | Ertolacci et al. | D6/595 |
| D382,713 | S | * | 8/1997 | Giesler, Sr. | D5/53 |
| 5,656,132 | A | * | 8/1997 | Farrington et al. | 162/117 |
| D384,210 | S | * | 9/1997 | du Grosriez | D5/57 |
| 5,667,636 | A | * | 9/1997 | Engel et al. | 162/117 |
| 5,672,248 | A | * | 9/1997 | Wendt et al. | 162/109 |
| D386,620 | S | * | 11/1997 | Giesler | D5/53 |
| 5,685,954 | A | * | 11/1997 | Marinack et al. | 162/112 |
| 5,714,041 | A | * | 2/1998 | Ayers et al. | 162/111 |
| D392,108 | S | * | 3/1998 | Diggins et al. | D5/57 |
| 5,746,887 | A | * | 5/1998 | Wendt et al. | 162/109 |
| 5,772,845 | A | * | 6/1998 | Farrington et al. | 162/109 |
| D395,955 | S | * | 7/1998 | du Grosriez | D5/57 |
| 5,830,558 | A | * | 11/1998 | Barnholtz | 428/171 |
| 5,846,379 | A | * | 12/1998 | Ampulski et al. | 162/109 |
| 5,846,636 | A | * | 12/1998 | Ruppel et al. | 428/154 |
| 5,900,114 | A | * | 5/1999 | Brown et al. | 162/117 |
| 5,904,811 | A | * | 5/1999 | Ampulski et al. | 162/117 |
| 5,906,711 | A | * | 5/1999 | Barnholtz | 162/132 |
| 5,919,556 | A | * | 7/1999 | Barnholtz | 428/218 |
| 5,922,439 | A | * | 7/1999 | Bredenick et al. | 428/154 |
| 5,932,068 | A | * | 8/1999 | Farrington et al. | 162/117 |
| 5,942,085 | A | * | 8/1999 | Neal et al. | 162/111 |
| D416,393 | S | * | 11/1999 | Enderby et al. | D5/53 |
| D419,307 | S | * | 1/2000 | Boyce | D5/53 |
| 6,017,417 | A | * | 1/2000 | Wendt et al. | 162/109 |
| D419,780 | S | | 2/2000 | Funk et al. | |
| D419,781 | S | * | 2/2000 | Pratt et al. | D5/53 |
| 6,030,690 | A | * | 2/2000 | McNeil et al. | 428/156 |
| D422,150 | S | * | 4/2000 | Enderby | D5/58 |
| D423,232 | S | * | 4/2000 | Reid | D5/57 |
| 6,048,938 | A | * | 4/2000 | Neal et al. | 525/185 |
| D425,354 | S | * | 5/2000 | Rogers et al. | D6/595 |
| D426,709 | S | * | 6/2000 | Latchoo et al. | D5/25 |
| D426,959 | S | * | 6/2000 | Jahner et al. | D5/53 |
| D426,960 | S | * | 6/2000 | Jahner et al. | D5/53 |
| D427,472 | S | * | 7/2000 | Rogers et al. | D6/595 |
| D428,264 | S | * | 7/2000 | Boyce | D5/53 |
| D428,265 | S | * | 7/2000 | Jahner et al. | D5/53 |
| D428,267 | S | * | 7/2000 | Romano et al. | D5/61 |
| 6,086,715 | A | * | 7/2000 | McNeil | 162/132 |
| D428,708 | S | * | 8/2000 | Jahner et al. | D5/53 |
| D428,709 | S | * | 8/2000 | Jahner et al. | D5/53 |
| D429,893 | S | * | 8/2000 | Jahner et al. | D5/53 |
| 6,106,928 | A | * | 8/2000 | Laurent et al. | 428/152 |
| D430,406 | S | * | 9/2000 | Ingalls | D5/57 |
| D430,407 | S | * | 9/2000 | Ingalls | D5/57 |
| 6,113,723 | A | * | 9/2000 | McNeil et al. | 156/209 |
| D431,371 | S | * | 10/2000 | Ingalls et al. | D5/57 |
| D431,372 | S | * | 10/2000 | Ingalls et al. | D5/57 |
| D433,239 | S | * | 11/2000 | Jahner et al. | D5/53 |
| 6,146,499 | A | * | 11/2000 | Lin et al. | 162/197 |
| D436,740 | S | * | 1/2001 | Jahner et al. | D5/53 |
| 6,171,442 | B1 | * | 1/2001 | Farrington et al. | 162/129 |
| 6,177,360 | B1 | * | 1/2001 | Carter et al. | 438/781 |
| D438,017 | S | * | 2/2001 | Reid | D5/57 |
| D438,711 | S | * | 3/2001 | Graff et al. | D5/53 |
| D440,773 | S | * | 4/2001 | Rogers et al. | D5/57 |
| D441,167 | S | * | 4/2001 | Graff et al. | D5/53 |
| D441,540 | S | * | 5/2001 | Enderby et al. | D5/53 |
| D441,541 | S | * | 5/2001 | Greenfield et al. | D5/57 |
| D442,786 | S | * | 5/2001 | Enderby et al. | D5/57 |
| D443,146 | S | * | 6/2001 | Enderby et al. | D5/57 |
| D447,875 | S | * | 9/2001 | Graff et al. | D5/53 |
| D448,574 | S | * | 10/2001 | Graff et al. | D5/53 |
| D448,575 | S | * | 10/2001 | Graff et al. | D5/53 |
| D449,452 | S | * | 10/2001 | Graff et al. | D5/53 |
| D449,453 | S | * | 10/2001 | Duritsch et al. | D5/58 |
| D450,934 | S | * | 11/2001 | Duritsch et al. | D5/58 |
| D451,682 | S | * | 12/2001 | Jahner et al. | D5/53 |
| 6,328,850 | B1 | * | 12/2001 | Phan et al. | 162/123 |
| 6,340,413 | B1 | * | 1/2002 | Nilsson et al. | 162/361 |
| D453,421 | S | * | 2/2002 | Greenfield et al. | D5/53 |
| 6,355,139 | B1 | * | 3/2002 | Baggot et al. | 162/109 |
| D458,033 | S | * | 6/2002 | Cassingham | D5/59 |
| 6,419,789 | B1 | * | 7/2002 | Yeh et al. | 162/109 |
| D461,317 | S | * | 8/2002 | Jahner et al. | D5/53 |
| 6,436,234 | B1 | * | 8/2002 | Chen et al. | 162/109 |
| 6,440,268 | B1 | * | 8/2002 | Baggot et al. | 162/118 |
| D463,137 | S | * | 9/2002 | Monroe et al. | D5/57 |
| D465,093 | S | * | 11/2002 | Jahner et al. | D5/53 |
| D465,338 | S | * | 11/2002 | Jahner et al. | D5/53 |
| D472,057 | S | * | 3/2003 | Cassingham | D5/59 |
| 6,565,707 | B2 | * | 5/2003 | Behnke et al. | 162/112 |
| 6,576,090 | B1 | * | 6/2003 | Trokhan et al. | 162/348 |
| 6,576,091 | B1 | * | 6/2003 | Cabell et al. | 162/348 |
| 6,602,577 | B1 | * | 8/2003 | Ostendorf et al. | 428/156 |
| 6,610,173 | B1 | * | 8/2003 | Lindsay et al. | 162/109 |
| 6,660,129 | B1 | * | 12/2003 | Cabell et al. | 162/109 |
| 6,660,362 | B1 | * | 12/2003 | Lindsay et al. | 428/131 |
| D494,766 | S | * | 8/2004 | Boerschinger et al. | D5/57 |
| D496,797 | S | * | 10/2004 | Boerschinger et al. | D5/57 |
| 6,827,818 | B2 | * | 12/2004 | Farrington et al. | 162/123 |
| 6,849,157 | B2 | * | 2/2005 | Farrington et al. | 162/123 |
| D508,613 | S | * | 8/2005 | Knobloch et al. | D5/57 |
| 6,998,017 | B2 | * | 2/2006 | Lindsay et al. | 162/109 |
| 7,156,954 | B2 | * | 1/2007 | Farrington et al. | 162/125 |
| 7,195,810 | B1 | * | 3/2007 | Schmidt et al. | 428/156 |
| D546,071 | S | * | 7/2007 | Barkey et al. | D5/57 |
| 7,311,800 | B2 | * | 12/2007 | Russell et al. | 162/117 |
| RE40,724 | E | * | 6/2009 | Barnholtz | 428/218 |
| 7,744,723 | B2 | * | 6/2010 | Sheehan et al. | 162/123 |
| 2002/0074100 | A1 | * | 6/2002 | Yeh et al. | 162/198 |
| 2003/0089475 | A1 | * | 5/2003 | Farrington et al. | 162/109 |
| 2003/0111169 | A1 | * | 6/2003 | Baggot et al. | 156/251 |
| 2004/0020614 | A1 | * | 2/2004 | Lindsay et al. | 162/109 |
| 2004/0045685 | A1 | * | 3/2004 | Horner et al. | 162/123 |
| 2004/0200590 | A1 | * | 10/2004 | Wilhelm | 162/118 |
| 2005/0098281 | A1 | * | 5/2005 | Schulz et al. | 162/117 |
| 2005/0148257 | A1 | * | 7/2005 | Hermans et al. | 442/327 |
| 2005/0178513 | A1 | * | 8/2005 | Russell et al. | 162/117 |
| 2005/0186397 | A1 | | 8/2005 | Prodoehl et al. | |
| 2005/0241788 | A1 | * | 11/2005 | Baggot et al. | 162/117 |
| 2005/0247416 | A1 | * | 11/2005 | Forry et al. | 162/109 |
| 2005/0258576 | A1 | * | 11/2005 | Forry et al. | 264/517 |
| 2006/0088696 | A1 | * | 4/2006 | Manifold et al. | 428/174 |
| 2006/0105660 | A1 | * | 5/2006 | Barnholtz et al. | 442/286 |

| | | | | |
|---|---|---|---|---|
| 2006/0113049 | A1 | 6/2006 | Knobloch et al. | |
| 2006/0278354 | A1 * | 12/2006 | Russell et al. | 162/117 |
| 2007/0062655 | A1 | 3/2007 | Knobloch et al. | |
| 2007/0126141 | A1 * | 6/2007 | Schmidt et al. | 264/119 |
| 2007/0137814 | A1 * | 6/2007 | Gao | 162/117 |
| 2007/0256802 | A1 * | 11/2007 | Sheehan et al. | 162/123 |
| 2007/0272381 | A1 * | 11/2007 | Elony et al. | 162/123 |
| 2008/0268205 | A1 * | 10/2008 | Vogel et al. | 428/156 |
| 2009/0041998 | A1 * | 2/2009 | Conner et al. | 428/219 |
| 2009/0136722 | A1 * | 5/2009 | Nyangiro et al. | 428/195.1 |

FOREIGN PATENT DOCUMENTS

| | | | |
|---|---|---|---|
| WO | WO 9423128 | A1 * | 10/1994 |
| WO | WO 9606223 | A1 * | 2/1996 |
| WO | WO 9609435 | A1 * | 3/1996 |
| WO | WO 9932722 | A1 * | 7/1999 |
| WO | WO 00/47097 | | 8/2000 |
| WO | WO 0047097 | A1 * | 8/2000 |
| WO | WO 2005080677 | A2 * | 9/2005 |
| WO | WO 2006133390 | A2 * | 12/2006 |
| WO | WO 2007130540 | A2 * | 11/2007 |
| WO | WO 2007130541 | A2 * | 11/2007 |
| WO | WO 2007139851 | A2 * | 12/2007 |
| WO | WO 2008050311 | A2 * | 5/2008 |

* cited by examiner

FIBROUS STRUCTURE PRODUCT WITH HIGH SOFTNESS

Matter enclosed in heavy brackets [ ] appears in the original patent but forms no part of this reissue specification; matter printed in italics indicates the additions made by reissue.

CROSS REFERENCE TO RELATED APPLICATIONS

This application claims the benefit of U.S. Provisional Application No. 60/797,244 filed on May 3, 2006.

FIELD OF THE INVENTION

The present invention relates to fibrous structure products, more specifically multi-ply fibrous structure products having multiple enhanced attributes and methods of making the same.

BACKGROUND OF THE INVENTION

Cellulosic fibrous structures are a staple of everyday life. Cellulosic fibrous structures are used as consumer products for paper towels, toilet tissue, facial tissue, napkins, and the like. The large demand for such paper products has created a demand for improved versions of the products and the methods of their manufacture.

Consumers prefer cellulosic fibrous structure products having multiple attributes. These attributes include softness, absorbency, strength, flexibility, and bulk. Consumers may especially prefer fibrous structure products having improved softness. Softness is the pleasing tactile sensation consumers perceive when they handle the product in their hands and while using the paper for its intended purpose. Consumers also desire products that will be useful for a broad variety of cleaning tasks including any type of surface from the cleaning of floors, countertops, drying dishes to the cleaning of faces, hands, arms, etc. Softness is generally a function of the compressibility of the paper, the flexibility of the paper, and the surface smoothness. These attributes may communicate to the consumer that the product will be versatile and that the product will be useful for a variety of cleaning tasks and surfaces.

Usually, however, the improvement of one attribute, may compromise the quality of another attribute. For example, increasing the softness of the fibrous structure product may decrease the absorbency, strength, and/or bulk of the product. Therefore, providing a product with improved softness and therefore an improved impression of product versatility without sacrificing the strength, bulk, and/or absorbency of the product is difficult.

Hence, the present invention unexpectedly provides an aesthetically pleasing soft and flexible tissue/towel product while also providing strength, bulk, and/or absorbency. The present invention provides a fibrous structure that exhibits a particular Flex Modulus, basis weight, and Compression Slope relationship, as described herein, which unexpectedly provides a product with enhanced softness without sacrificing strength, bulk, and/or absorbency attributes.

SUMMARY OF THE INVENTION

The present invention relates to a fibrous structure product comprising: two or more plies of fibrous structure wherein the fibrous structure has a Compression Slope from about 11 to about 30; a basis weight from about 26 lbs/3000 $ft^2$ to about 50 lbs/3000 $ft^2$; a Wet Caliper of greater than about 18 mils; and a Flex Modulus from about 0.1 to about 0.8.

The present invention further relates to a fibrous structure product comprising: one ply of fibrous structure wherein the fibrous structure has a Compression Slope from about 11 to about 30; a basis weight from about 28 lbs/3000 $ft^2$ to about 50 lbs/3000 $ft^2$; a Wet Caliper greater than about 18 mils; and a Flex Modulus from about 0.1 to about 0.8.

BRIEF DESCRIPTION OF THE DRAWINGS

Without intending to limit the invention, embodiments are described in more detail below.

DETAILED DESCRIPTION OF THE INVENTION

Definitions

Figure 1:
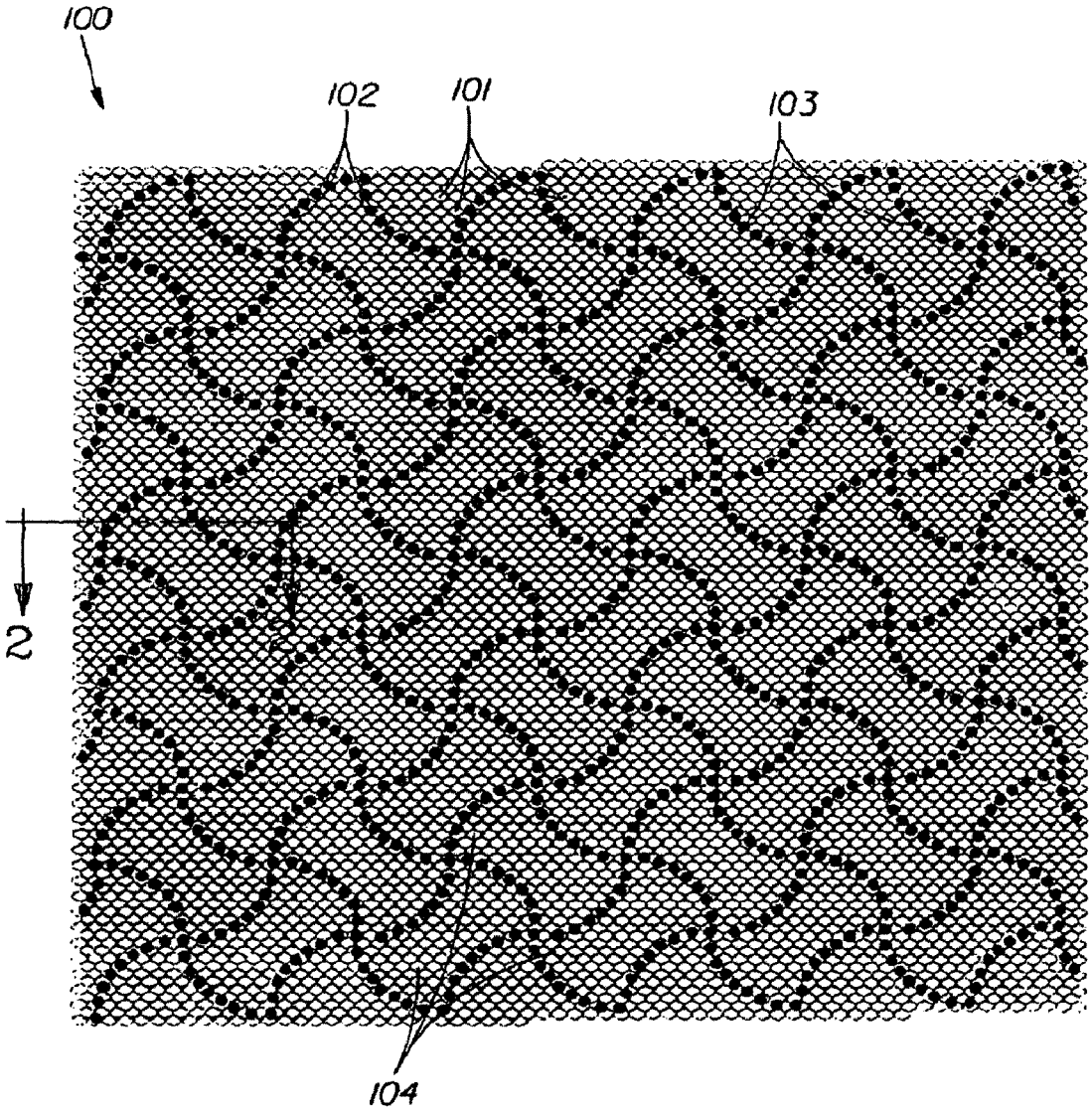
FIG. 1 is a fragmentary plan view of a multi-ply fibrous structure product displaying an embodiment of the present invention having domes formed during the paper making process, in a regular arrangement, and an embossment pattern on the first ply made according to the present invention.

As used herein, "paper product" refers to any formed, fibrous structure products, traditionally, but not necessarily, comprising cellulose fibers. In one embodiment, the paper products of the present invention include tissue-towel paper products.

A "tissue-towel paper product" refers to products comprising paper tissue or paper towel technology in general, including, but not limited to, conventional felt-pressed or conventional wet-pressed tissue paper, pattern densified tissue paper, starch substrates, and high bulk, uncompacted tissue paper. Non-limiting examples of tissue-towel paper products include toweling, facial tissue, bath tissue, table napkins, and the like.

"Ply" or "Plies", as used herein, means an individual fibrous structure or sheet of fibrous structure, optionally to be disposed in a substantially contiguous, face-to-face relationship with other plies, forming a multi-ply fibrous structure. It is also contemplated that a single fibrous structure can effectively form two "plies" or multiple "plies", for example, by being folded on itself. In one embodiment, the ply has an end use as a tissue-towel paper product. A ply may comprise one or more wet-laid layers, air-laid layers, and/or combinations thereof. If more than one layer is used, it is not necessary for each layer to be made from the same fibrous structure. Further, the fibers may or may not be homogenous within a layer. The actual makeup of a tissue paper ply is generally determined by the desired benefits of the final tissue-towel paper product, as would be known to one of skill in the art. The fibrous structure may comprise one or more plies of non-woven materials in addition to the wet-laid and/or air-laid plies.

The term "fibrous structure", as used herein, means an arrangement of fibers produced in any papermaking machine known in the art to create a ply of paper. "Fiber" means an elongate particulate having an apparent length greatly exceeding its apparent width. More specifically, and as used herein, fiber refers to such fibers suitable for a papermaking process.

"Basis Weight", as used herein, is the weight per unit area of a sample reported in lbs/3000 $ft^2$ or $g/m^2$.

"Machine Direction" or "MD", as used herein, means the direction parallel to the flow of the fibrous structure through the papermaking machine and/or product manufacturing equipment.

"Cross Machine Direction" or "CD", as used herein, means the direction perpendicular to the machine direction in the same plane of the fibrous structure and/or fibrous structure product comprising the fibrous structure.

"Sheet Caliper" or "Caliper", as used herein, means the macroscopic thickness of a product sample under load.

"Densified", as used herein, means a portion of a fibrous structure product that is characterized by having a relatively high-bulk field of relatively low fiber density and an array of densified zones of relatively high fiber density. The high-bulk field is alternatively characterized as a field of pillow regions. The densified zones are alternatively referred to as knuckle regions. The densified zones may be discretely spaced within the high-bulk field or may be interconnected, either fully or partially, within the high-bulk field. One embodiment of a method of making a pattern densified fibrous structure and devices used therein are described in U.S. Pat. Nos. 4,529,480 and 4,528,239.

"Non-densified", as used herein, means a portion of a fibrous structure product that exhibits a lesser density than another portion of the fibrous structure product.

"Bulk Density", as used herein, means the apparent density of an entire fibrous structure product rather than a discrete area thereof.

"Laminating" refers to the process of firmly uniting superimposed layers of paper with or without adhesive, to form a multi-ply sheet.

"Non-naturally occurring fiber" as used herein means that the fiber is not found in nature in that form. In other words, some chemical processing of materials needs to occur in order to obtain the non-naturally occurring fiber. For example, a wood pulp fiber is a naturally occurring fiber, however, if the wood pulp fiber is chemically processed, such as via a lyocell-type process, a solution of cellulose is formed. The solution of cellulose may then be spun into a fiber. Accordingly, this spun fiber would be considered to be a non-naturally occurring fiber since it is not directly obtainable from nature in its present form.

"Naturally occurring fiber" as used herein means that a fiber and/or a material is found in nature in its present form. An example of a naturally occurring fiber is a wood pulp fiber.

Fibrous Structure Product

In one embodiment the fibrous structure product has a Compression Slope of from about 11 to about 30; in another embodiment from about 12 to about 25, and in yet another embodiment from about 13 to about 25 or about 13 to about 23.

In one embodiment, the fibrous structure product has a basis weight of greater than about 26 lbs/3000 $ft^2$, in another embodiment from about 26 lbs/3000 $ft^2$ to about 50 lbs/3000 $ft^2$. In another embodiment the basis weight is about 27 lbs/3000 $ft^2$ to about 40 lbs/3000 $ft^2$; in another embodiment the basis weight is about 30 lbs/3000 $ft^2$ and about 40 lbs/3000 $ft^2$ and in another embodiment the basis weight is about 32 lbs/3000 $ft^2$ and about 37 lbs/3000 $ft^2$.

In one embodiment the fibrous structure product has a Wet Caliper of greater than about 18 mils or greater than about 25 mils; in another embodiment from about 18, 22, 27, 28 mils to about 30, 32, 35, 40 mils, or any combination of these ranges.

In one embodiment the fibrous structure product has a Flex Modulus from about 0.1 to about 0.8; in another embodiment from about 0.2 to about 0.75; and in another embodiment from about 0.3 to about 0.7.

In still yet another embodiment, the fibrous structure product exhibits a sheet caliper or loaded caliper of at least about 29 mils, in another embodiment from about 30 mils to about 50 mils, and/or from about 33 mils to about 45 mils.

In one embodiment the fibrous structure has a High Load Caliper of from about 17 mils to about 45 mils; in another embodiment from about 18 mils to about 30 mils; in another embodiment from about 19 mils to about 28 mils, and in another embodiment from about 20 mils to about 25 mils.

In one embodiment the fibrous structure product exhibits a wet burst strength of greater than about 270 grams, in another embodiment from about 290 g, 300 g, 315 g to about 360 g, 380 g, 400 g, or any combination of these ranges. A nonlimiting example of an embossed multi-ply fibrous structure product 100 in accordance with the present invention is shown in FIG. 1. As shown in FIG. 1 a fragmentary plan view of a ply of multi-ply fibrous structure 100 comprising two plies of fibrous structure wherein at least one of the plies of the paper product has a plurality of domes 101 formed by a resin coated woven belt during the papermaking process and ordered in a regular arrangement. The domes may also be ordered in a random arrangement. The exemplary multi-ply fibrous structure 100 further comprises a non geometric foreground pattern 103 of embossments 102 on the first ply (may also be on the second ply) according to the present invention. The embossments 102 form a latticework, defining a plurality of unembossed cells 104; wherein each cell comprises a plurality of domes 101 formed during the papermaking process.

Figure 2:
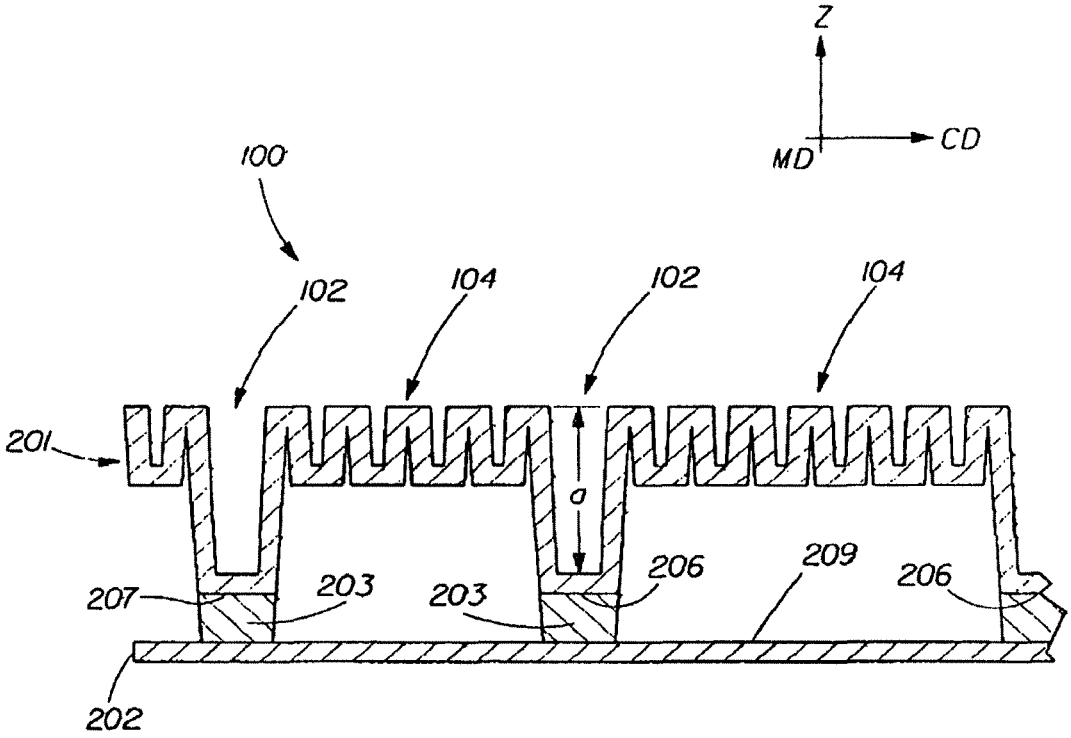
FIG. 2 is a cross sectional view of a portion of the multi-py fibrous structure product shown in FIG. 1 as taken along line 2-2.

The multi-ply fibrous structure product 100 in accordance with cross section 2-2 of FIG. 1 is shown in FIG. 2. As shown in FIG. 2, the multi-ply fibrous structure product 100 comprises a first ply 201 and a second ply 202 that are bonded together by an adhesive 203 along the adjacent inside first-ply surface 207 and inside second-ply surface 209 at first-ply bond sites 206. The multi-ply fibrous structure product 100 further comprises embossments 102. The cells 104 are not adhered to the adjacent ply. The cells 104 exhibit an embossment height, a, of from about 300 μm to about 1500 μm. The embossment height a extends in the Z-direction which is perpendicular to the plan formed in the machine direction and the cross machine direction of the multi-ply fibrous structure product 100. In one embodiment of the present invention, the multi-ply fibrous structure product 100 comprises an embossment height a from about 300, 600, or 700 μm to about 1,500 μm, and in another embodiment from about 800 μm or to about 1,000 μm as measured by the GFM MikroCAD optical profiler instrument described according to U.S. Application Nos. 2006/0005916A1, 2006/0013998A1. The bond sites 206 may be densified or non-densified In one embodiment, because of the deformation caused by the embossments 102 of the first ply 201, the extensibility of the second ply 202 as compared to the first ply 201 constrains the first ply from being elongated substantially in the cross machine direction plane of the paper product. Suitable means of embossing include those disclosed in U.S. Pat. Nos. 3,323,983, 5,468,323, 5,693,406, 5,972,466, 6,030,690 and 6,086,715.

As exemplified in FIGS. 1 and 2, the embossments on the present invention multi-ply fibrous structure product 100 may be arranged to form a non geometric foreground pattern 103 or, in some embodiments, a curved latticework. The curved latticework of embossments can form an outline of a foreground pattern of unembossed cells in the latticework. The lines that substantially describe each segment of the outline of the foreground pattern of embossments that form the latticework can be, but are not limited to, curved, wavy, snaking, S-waves, and sinusoidal. The latticework may form regular or irregular patterns. In one embodiment of the present invention, the embossments may be arranged to form one or more non-geometric foreground patterns of unembossed cells wherein no two cells are defined by the same embossments.

The present invention is equally applicable to all types of consumer paper products such as paper towels, toilet tissue, facial tissue, napkins, and the like.

The present invention contemplates the use of a variety of paper making fibers, such as, natural fibers, synthetic fibers, as well as any other suitable fibers, starches, and combinations thereof. Paper making fibers useful in the present invention include cellulosic fibers commonly known as wood pulp fibers. Applicable wood pulps include chemical pulps, such as Kraft, sulfite and sulfate pulps, as well as mechanical pulps including, groundwood, thermomechanical pulp, chemically modified, and the like. Chemical pulps may be used in tissue towel embodiments since they are known to those of skill in the art to impart a superior tactical sense of softness to tissue sheets made therefrom. Pulps derived from deciduous trees (hardwood) and/or coniferous trees (softwood) can be utilized herein. Such hardwood and softwood fibers can be blended or deposited in layers to provide a stratified web. Exemplary layering embodiments and processes of layering are disclosed in U.S. Pat. Nos. 3,994,771 and 4,300,981. Additionally, fibers derived from wood pulp such as cotton linters, bagesse, and the like, can be used. Additionally, fibers derived from recycled paper, which may contain any of all of the categories as well as other non-fibrous materials such as fillers and adhesives used to manufacture the original paper product may be used in the present web. In addition, fibers and/or filaments made from polymers, specifically hydroxyl polymers, may be used in the present invention. Non-limiting examples of suitable hydroxyl polymers include polyvinyl alcohol, starch, starch derivatives, chitosan, chitosan derivatives, cellulose derivatives, gums, arabinans, galactans, and combinations thereof. Additionally, other synthetic fibers such as rayon, polyethylene, and polypropylene fibers can be used within the scope of the present invention. Further, such fibers may be latex bonded.

In one embodiment the paper is produced by forming a predominantly aqueous slurry comprising about 95% to about 99.9% water. In one embodiment the non-aqueous component of the slurry used to make the fibrous structure comprises from about 5% to about 80% of eucalpyptus fibers by weight. In another embodiment the non-aqueous components comprises from about 8% to about 60% of eucalpyptus fibers by weight, and in yet another embodiment from about 12% to about 40% of eucalpyptus fibers by weight of the non-aqueous component of the slurry. The aqueous slurry can be pumped to the headbox of the papermaking process.

In one embodiment the present invention may comprise a co-formed fibrous structure. A co-formed fibrous structure comprises a mixture of at least two different materials wherein at least one of the materials comprises a non-naturally occurring fiber, such as a polypropylene fiber, and at least one other material, different from the first material, comprising a solid additive, such as another fiber and/or a particulate. In one example, a co-formed fibrous structure comprises solid additives, such as naturally occurring fibers, such as wood pulp fibers, and non-naturally occurring fibers, such as polypropylene fibers.

Synthetic fibers useful herein include any material, such as, but not limited to polymers, such as those selected from the group consisting of polyesters, polypropylenes, polyethylenes, polyethers, polyamides, polyhydroxyalkanoates, polysaccharides, and combinations thereof. More specifically, the material of the polymer segment may be selected from the group consisting of poly(ethylene terephthalate), poly(butylene terephthalate), poly(1,4-cyclohexylenedimethylene terephthalate), isophthalic acid copolymers (e.g., terephthalate cyclohexylene-dimethylene isophthalate copolymer), ethylene glycol copolymers (e.g., ethylene terephthalate cyclohexylene-dimethylene copolymer), polycaprolactone, poly(hydroxylether ester), poly(hydroxylether amide), polyesteramide, poly(lactic acid), polyhydroxybutyrate, and combinations thereof.

Further, the synthetic fibers can be a single component (i.e., single synthetic material or a mixture to make up the entire fiber), bi-component (i.e., the fiber is divided into regions, the regions including two or more different synthetic materials or mixtures thereof and may include co-extruded fibers) and combinations thereof. It is also possible to use bicomponent fibers, or simply bicomponent or sheath polymers. Nonlimiting examples of suitable bicomponent fibers are fibers made of copolymers of polyester (polyethylene terephthalate)/polyester (polyethylene terephthalate) otherwise known as "CoPET/PET" fibers, which are commercially available from Fiber Innovation Technology, Inc., Johnson City, Tenn.

These bicomponent fibers can be used as a component fiber of the structure, and/or they may be present to act as a binder for the other fibers present. Any or all of the synthetic fibers may be treated before, during, or after the process of the present invention to change any desired properties of the fibers. For example, in certain embodiments, it may be desirable to treat the synthetic fibers before or during the papermaking process to make them more hydrophilic, more wettable, etc.

These multicomponent and/or synthetic fibers are further described in U.S. Pat. Nos. 6,746,766, issued on Jun. 8, 2004; 6,946,506, issued Sep. 20, 2005; 6,890,872, issued May 10, 2005; US Publication No. 2003/0077444A1, published on Apr. 24, 2003; US Publication No. 2003/0168912A1, published on Nov. 14, 2002; US Publication No. 2003/0092343A1, published on May 15, 2003; US Publication No. 2002/0168518A1, published on Nov. 14, 2002; US Publication No. 2005/0079785A1, published on Apr. 14, 2005; US Publication No. 2005/0026529A1, published on Feb.3, 2005; US Publication No. 2004/0154768A1, published on Aug. 12, 2004; US Publication No. 2004/0154767, published on Aug. 12, 2004; US Publication No. 2004/0154769A1, published on Aug. 12, 2004; US Publication No. 2004/0157524A1, published on Aug. 12, 2004; US Publication No. 2005/0201965A1, published on Sep. 15, 2005.

The fibrous structure may comprise any tissue-towel paper product known in the industry. Embodiment of these substrates may be made according U.S. Pat. Nos. 4,191,609 issued Mar. 4, 1980 to Trokhan; 4,300,981 issued to Carstens on Nov. 17, 1981; 4,191,609 issued to Trokhan on Mar. 4, 1980; 4,514,345 issued to Johnson et al. on Apr. 30, 1985; 4,528,239 issued to Trokhan on Jul. 9, 1985; 4,529,480 issued to Trokhan on Jul. 16, 1985; 4,637,859 issued to Trokhan on Jan. 20, 1987; 5,245,025 issued to Trokhan et al. on Sep. 14, 1993; 5,275,700 issued to Trokhan on Jan. 4, 1994; 5,328,565 issued to Rasch et al. on Jul. 12, 1994; 5,334,289 issued to Trokhan et al. on Aug. 2, 1994; 5,364,504 issued to Smurkowski et al. on Nov. 15, 1995; 5,527,428 issued to Trokhan et al. on Jun. 18, 1996; 5,556,509 issued to Trokhan et al. on Sep. 17, 1996; 5,628,876 issued to Ayers et al. on May 13, 1997; 5,629,052 issued to Trokhan et al. on May 13, 1997; 5,637,194 issued to Ampulski et al. on Jun. 10, 1997; 5,411,636 issued to Hermans et al. on May 2, 1995; EP 677612 published in the name of Wendt et al. on Oct. 18, 1995, and U.S. Patent Application 2004/0192136A1 published in the name of Gusky et al. on Sep. 30, 2004.

The tissue-towel substrates may be manufactured via a wet-laid making process where the resulting web is through-air-dried or conventionally dried. Optionally, the substrate may be foreshortened by creping or by wet microcontraction. Creping and/or wet microcontraction are disclosed in commonly assigned U.S. Pat. Nos. 6,048,938 issued to Neal et al. on Apr. 11, 2000; 5,942,085 issued to Neal et al. on Aug. 24, 1999; 5,865,950 issued to Vinson et al. on Feb. 2, 1999; 4,440,597 issued to Wells et al. on Apr. 3, 1984; 4,191,756 issued to Sawdai on May 4, 1980; and 6,187,138 issued to Neal et al. on Feb. 13, 2001.

Conventionally pressed tissue paper and methods for making such paper are known in the art, for example U.S. Pat. No. 6,547,928 issued to Barnholtz et al. on Apr. 15, 2003. One suitable tissue paper is pattern densified tissue paper which is characterized by having a relatively high-bulk field of relatively low fiber density and an array of densified zones of relatively high fiber density. The high-bulk field is alternatively characterized as a field of pillow regions. The densified zones are alternatively referred to as knuckle regions. The densified zones may be discretely spaced within the high-bulk field or may be interconnected, either fully or partially, within the high-bulk field. Processes for making pattern densified tissue webs are disclosed in U.S. Pat. No. 3,301,746, issued to Sanford, et al. on Jan. 31, 1967; U.S. Pat. No. 3,974,025, issued to Ayers on Aug. 10, 1976; U.S. Pat. No. 4,191,609, issued to on Mar. 4, 1980; and U.S. Pat. No. 4,637,859, issued to on Jan. 20, 1987; U.S. Pat. No. 3,301,746, issued to Sanford, et al. on Jan. 31, 1967; U.S. Pat. No. 3,821,068, issued to Salvucci, Jr. et al. on May 21, 1974; U.S. Pat. No. 3,974,025, issued to Ayers on Aug. 10, 1976; U.S. Pat. No. 3,573,164, issued to Friedberg, et al. on Mar. 30, 1971; U.S. Pat. No. 3,473,576, issued to Amneus on Oct. 21, 1969; U.S. Pat. No. 4,239,065, issued to Trokhan on Dec. 16, 1980; and U.S. Pat. No. 4,528,239, issued to Trokhan on Jul. 9, 1985.

Uncompacted, non pattern-densified tissue paper structures are also contemplated within the scope of the present invention and are described in U.S. Pat. No. 3,812,000 issued to Joseph L. Salvucci, Jr. et al. on May 21, 1974; and U.S. Pat. No. 4,208,459, issued to Henry E. Becker, et al. on Jun. 17, 1980. Uncreped tissue paper as defined in the art are also contemplated. The techniques to produce uncreped tissue in this manner are taught in the prior art. For example, Wendt, et al. in European Patent Application 0 677 612A2, published Oct. 18, 1995; Hyland, et al. in European Patent Application 0 617 164 Al, published Sep. 28, 1994; and Farrington, et al. in U.S. Pat. No. 5,656,132 issued Aug. 12, 1997.

Uncreped tissue paper, in one embodiment, refers to tissue paper which is non-compressively dried, by through air drying. Resultant through air dried webs are pattern densified such that zones of relatively high density are dispersed within a high bulk field, including pattern densified tissue wherein zones of relatively high density are continuous and the high bulk field is discrete. The techniques to produce uncreped tissue in this manner are taught in the prior art. For example, Wendt, et. al. in European Patent Application 0 677 612A2, published Oct. 18, 1995; Hyland, et. al. in European Patent Application 0 617 164 A1, published Sep. 28, 1994; and Farrington, et. al. in U.S. Pat. No. 5,656,132 published Aug. 12, 1997.

Other materials are also intended to be within the scope of the present invention as long as they do not interfere or counteract any advantage presented by the instant invention.

The substrate which comprises the fibrous structure of the present invention may be cellulosic, non-cellulosic, or a combination of both. The substrate may be conventionally dried using one or more press felts or through-air dried. If the substrate which comprises the paper according to the present invention is conventionally dried, it may be conventionally dried using a felt which applies a pattern to the paper as taught by commonly assigned U.S. Pat. No. 5,556,509 issued Sep. 17, 1996 to Trokhan et al. and PCT Application WO 96/00812 published Jan. 11, 1996 in the name of Trokhan et al. The substrate which comprises the paper according to the present invention may also be through air dried. A suitable through air dried substrate may be made according to commonly assigned U.S. Pat. No. 4,191,609.

Plurality of Domes

In one embodiment at least one ply of fibrous structure comprises a plurality of domes formed during the papermaking process wherein the ply comprises from about 10 to about 1000 (i.e.; about 1.55 to about 155 domes per square centimeter) domes per square inch of the ply. In another embodiment the ply comprises from about 25 to about 500 domes per square inch of the ply or product; in another embodiment the ply comprises from about 50 to about 300 and in another embodiment the ply comprises from about 120 to about 200 or from about 130 to about 160 domes per square inch of the ply.

In one embodiment, the fibrous structure is through air dried on a belt having a patterned framework. The belt according to the present invention may be made according to any of commonly assigned U.S. Pat. No. 4,637,859 issued Jan. 20, 1987 to Trokhan; U.S. Pat. No. 4,514,345 issued Apr. 30, 1985 to Johnson et al.; U.S. Pat. No. 5,328,565 issued Jul. 12, 1994 to Rasch et al.; and U.S. Pat. No. 5,334,289 issued Aug. 2, 1994 to Trokhan et al. The belts that result from the belt making techniques disclosed in the referenced patents provide advantages over conventional belts in the art and are herein referred to as resin coated woven belts.

In one embodiment, the patterned framework of the belt imprints a pattern comprising an essentially continuous network onto the paper and further has deflection conduits dispersed within the pattern. The deflection conduits extend between opposed first and second surfaces of the framework. The deflection conduits allow domes to form in the paper.

In one embodiment, the fibrous substrate is a through air dried paper made according to the foregoing patents and has a plurality of domes formed during the papermaking process which are dispersed throughout an essentially continuous network region. The domes extend generally perpendicular to the paper and increase its caliper. The domes generally correspond in geometry, and during papermaking in position, to the deflection conduits of the belt described above. There are an infinite variety of possible geometries, shapes, and arrangements for the deflection conduits and the domes formed in the paper therefrom. These shapes include those disclosed in commonly assigned U.S. Pat. No. 5,275,700 issued on Jan. 4, 1994 to Trokan. Examples of these shapes include, but are not limited to those described as a bow-tie pattern or snowflake pattern. Further examples of these shapes include, but are not limited to, circles, ovals, diamonds, triangles, hexagons, and various quadrilaterals.

The domes that form the essentially continuous network of domes protrude outwardly from the plane of the paper due to molding into the deflection conduits during the papermaking process. By molding into the deflection conduits during the papermaking process, the regions of the paper comprising the domes are deflected in the Z-direction.

If the fibrous structure has domes, or other prominent features in the topography, the domes, or other prominent feature, may be arranged in a variety of different configurations. These configurations include, but are not limited to: regular arrangements, random arrangements, multiple regular arrangements, and combinations thereof.

The fibrous structure product according to the present invention having domes may be made according to commonly assigned U.S. Pat. No. 4,528,239 issued Jul. 9, 1985 to Trokhan; U.S. Pat. No. 4,529,480 issued Jul. 16, 1985 to Trokhan; U.S. Pat. No. 5,275,700 issued Jan. 4, 1994 to Trokhan; U.S. Pat. No. 5,364,504 issued Nov. 15, 1985 to Smurkoski et al.; U.S. Pat. No. 5,527,428 issued Jun. 18, 1996 to Trokhan et al.; U.S. Pat. No. 5,609,725 issued Mar. 11, 1997 to Van Phan; U.S. Pat. No. 5,679,222 issued Oct. 21, 1997 to Rasch et al.; U.S. Pat. No. 5,709,775 issued Jan. 20, 1995 to Trokhan et al.; U.S. Pat. No. 5,795,440 issued Aug. 18, 1998 to Ampulski et al.; U.S. Pat. No. 5,900,122 issued May 4, 1999 to Huston; U.S. Pat. No. 5,906,710 issued May 25, 1999 to Trokhan; U.S. Pat. No. 5,935,381 issued Aug. 10, 1999 to Trokhan et al.; and U.S. Pat. No. 5,938,893 issued Aug. 17, 1999 to Trokhan et al.

In one embodiment the fibrous structure is made using the papermaking belt as disclosed in U.S. Pat. No. 5,334,289, issued on Aug. 2, 1994, Paul Trokhan and Glenn Boutilier.

In one embodiment the plies of the multi-ply fibrous structure may be the same substrate respectively or the plies may comprise different substrates combined to create desired consumer benefits. In one embodiment the fibrous structures comprise two plies of tissue substrate. In another embodiment the fibrous structure comprises a first ply, a second ply, and at least one inner ply.

In one embodiment of the present invention, the fibrous structure product has a plurality of embossments. In one embodiment the embossment pattern is applied only to the first ply, and therefore, each of the two plies serve different objectives and are visually distinguishable. For instance, the embossment pattern on the first ply provides, among other things, improved aesthetics regarding thickness and quilted appearance, while the second ply, being unembossed, is devised to enhance functional qualities such as absorbency, thickness and strength. In another embodiment the fibrous structure product is a two ply product wherein both plies comprise a plurality of embossments.

Suitable means of embossing include those disclosed in U.S. Pat. Nos. 3,323,983 issued to Palmer on Sep. 8, 1964; 5,468,323 issued to McNeil on Nov. 21, 1995; 5,693,406 issued to Wegele et al. on Dec. 2, 1997; 5,972,466 issued to Trokhan on Oct. 26, 1999; 6,030,690 issued to McNeil et al. on Feb. 29, 2000; and 6,086,715 issued to McNeil on July 11.

Suitable means of laminating the plies include but are not limited to those methods disclosed in commonly assigned U.S. Pat. Nos. 6,113,723 issued to McNeil et al. on Sep. 5, 2000; 6,086,715 issued to McNeil on Jul. 11, 2000; 5,972,466 issued to Trokhan on Oct. 26, 1999; 5,858,554 issued to Neal et al. on Jan. 12, 1999; 5,693,406 issued to Wegele et al. on Dec. 2, 1997; 5,468,323 issued to McNeil on Nov. 21, 1995; 5,294,475 issued to McNeil on Mar. 15, 1994.

The fibrous structure product may be in roll form. When in roll form, the fibrous structure product may be wound about a core or may be wound without a core.

Optional Ingredients

The multi-ply fibrous structure product herein may optionally comprise one or more ingredients that may be added to the aqueous papermaking furnish or the embryonic web. These optional ingredients may be added to impart other desirable characteristics to the product or improve the papermaking process so long as they are compatible with the other components of the fibrous structure product and do not significantly and adversely effect the functional qualities of the present invention. The listing of optional chemical ingredients is intended to be merely exemplary in nature, and are not meant to limit the scope of the invention. Other materials may be included as well so long as they do not interfere or counteract the advantages of the present invention.

A cationic charge biasing species may be added to the papermaking process to control the zeta potential of the aqueous papermaking furnish as it is delivered to the papermaking process. These materials are used because most of the solids in nature have negative surface charges, including the surfaces of cellulosic fibers and fines and most inorganic fillers. In one embodiment the cationic charge biasing species is alum. In addition charge biasing may be accomplished by use of relatively low molecular weight cationic synthetic polymer, in one embodiment having a molecular weight of no more than about 500,000 and in another embodiment no more than about 200,000, or even about 100,000. The charge densities of such low molecular weight cationic synthetic polymers are relatively high. These charge densities range from about 4 to about 8 equivalents of cationic nitrogen per kilogram of polymer. An exemplary material is Cypro 514®, a product of Cytec, Inc. of Stamford, Conn.

High surface area, high anionic charge microparticles for the purposes of improving formation, drainage, strength, and retention may also be included herein. See, for example, U.S. Pat. No. 5,221,435, issued to Smith on Jun. 22, 1993.

If permanent wet strength is desired, cationic wet strength resins may be optionally added to the papermaking furnish or to the embryonic web. From about 2 to about 50 lbs./ton of dry paper fibers of the cationic wet strength resin may be used, in another embodiment from about 5 to about 30 lbs./ton, and in another embodiment from about 10 to about 25 lbs./ton.

The cationic wet strength resins useful in this invention include without limitation cationic water soluble resins. These resins impart wet strength to paper sheets and are well known to the paper making art. These resins may impart either temporary or permanent wet strength to the sheet. Such resins include the following Hercules products. KYMENE® resins obtainable from Hercules Inc., Wilmington, Del. may be used, including KYMENE® 736 which is a polyethyleneimine (PEI) wet strength polymer. It is believed that the PEI imparts wet strength by ionic bonding with the pulps carboxyl sites. KYMENE® 557LX is polyamide epichlorohydrin (PAE) wet strength polymer. It is believed that the PAE contains cationic sites that lead to resin retention by forming an ionic bond with the carboxyl sites on the pulp. The polymer contains 3-azetidinium groups which react to form covalent bonds with the pulps' carboxyl sites as well as with the polymer backbone. The product must undergo curing in the form of heat or undergo natural aging for the reaction of the azentidinium group. KYMENE® 450 is a base activated epoxide polyamide epichlorohydrin polymer. It is theorized that like 557LX the resin attaches itself ionically to the pulps' carboxyl sites. The epoxide group is much more reactive than the azentidinium group. The epoxide group reacts with both the hydroxyl and carboxyl sites on the pulp, thereby giving higher wet strengths. The epoxide group can also crosslink to the polymer backbone. KYMENE® 2064 is also a base activated epoxide polyamide epichlorohydrin polymer. It is theorized that KYMENE® 2064 imparts its wet strength by the same mechanism as KYMENE® 450. KYMENE® 2064 differs in that the polymer backbond contains more epoxide functional groups than does KYMENE® 450. Both KYMENE® 450 and KYMENE® 2064 require curing in the form of heat or natural aging to fully react all the epoxide groups, however, due to the reactiveness of the epoxide group, the majority of the groups (80-90%) react and impart wet strength off the paper machine. Mixtures of the foregoing may be used. Other suitable types of such resins include urea-formaldehyde resins, melamine formaldehyde resins, polyamide-epichlorohydrin resins, polyethyleneimine resins, polyacrylamide resins, dialdehyde starches, and mixtures thereof. Other suitable types of such resins are described in U.S. Pat. No. 3,700,623, issued Oct. 24, 1972; U.S. Pat. No. 3,772,076, issued Nov. 13, 1973; U.S. Pat. No. 4,557,801, issued Dec. 10, 1985 and U.S. Pat. No. 4,391,878, issued Jul. 5, 1983.

In one embodiment, the cationic wet strength resin may be added at any point in the processes, where it will come in contact with the paper fibers prior to forming the wet web.

If enhanced absorbency is needed, surfactants may be used to treat the paper webs of the present invention. The level of surfactant, if used, in one embodiment, from about 0.01% to about 2.0% by weight, based on the dry fiber weight of the tissue web. In one embodiment the surfactants have alkyl chains with eight or more carbon atoms. Exemplary anionic surfactants include linear alkyl sulfonates and alkylbenzene sulfonates. Exemplary nonionic surfactants include alkylglycosides including alkylglycoside esters such as Crodesta SL40® which is available from Croda, Inc. (New York. N.Y.); alkylglycoside ethers as described in U.S. Pat. No. 4,011,389, issued to Langdon, et al. on Mar. 8, 1977; and alkylpolyethoxylated esters such as Pegosperse 200 ML available from Glyco Chemicals, Inc. (Greenwich, Conn.) and IGEPAL RC-520® available from Rhone Poulenc Corporation (Cranbury, N.J.). Alternatively, cationic softener active ingredients with a high degree of unsaturated (mono and/or poly) and/or branched chain alkyl groups can greatly enhance absorbency.

In addition, chemical softening agents may be used. In one embodiment the chemical softening agents comprise quaternary ammonium compounds including, but not limited to, the well-known dialkyldimethylammonium salts (e.g., ditallowedimethylammonium chloride, ditallowedimethylammonium methyl sulfate ("DTDMAMS"), di(hydrogenated tallow)dimethyl ammonium chloride, etc.). In another embodiment variants of these softening agents include mono or diester variations of the before mentioned dialkyldimethylammonium salts and ester quaternaries made from the reaction of fatty acid and either methyl diethanol amine and/or triethanol amine, followed by quaternization with methyl chloride or dimethyl sulfate.

Another class of papermaking-added chemical softening agents comprises organo-reactive polydimethyl siloxane ingredients, including the amino functional polydimethyl siloxane. The fibrous structure product of the present invention may further comprise a diorganopolysiloxane-based polymer. These diorganopolysiloxane-based polymers useful in the present invention span a large range of viscosities; from about 10 to about 10,000,000 centistokes (cSt)at 25° C. Some diorganopolysiloxane-based polymers useful in this invention exhibit viscosities greater than 10,000,000 centistokes (cSt) at 25° C. and therefore are characterized by manufacturer specific penetration testing. Examples of this characterization are GE silicone materials SE 30 and SE 63 with penetration specifications of 500-1500 and 250-600 (tenths of a millimeter) respectively.

Among the diorganopolysiloxane polymers of the present invention are diorganopolysiloxane polymers comprising repeating units, where said units correspond to the formula $(R_2SiO)_n$, where R is a monovalent radical containing from 1 to 6 carbon atoms, in one embodiment selected from the group consisting of methyl, ethyl, propyl, isopropyl, butyl, isobutyl, t-butyl, amyl, hexyl, vinyl, allyl, cyclohexyl, amino alkyl, phenyl, fluoroalkyl and mixtures thereof. The diorganopoylsiloxane polymers which may be employed in the present invention may contain one or more of these radicals as substituents on the siloxane polymer backbone. The diorganopolysiloxane polymers may be terminated by triorganosilyl groups of the formula $(R'_3Si)$ where R' is a monovalent radical selected from the group consisting of radicals containing from 1-6 carbon atoms, hydroxyl groups, alkoxyl groups, and mixtures thereof. In one embodiment the silicone polymer is a higher viscosity polymers, e.g., poly(dimethylsiloxane), herein referred to as PDMS or silicone gum, having a viscosity of at least 100,000 cSt.

Silicone gums, optionally useful herein, corresponds to the formula:

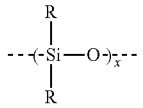

where R is a methyl group.

Fluid diorganopolysiloxane polymers that are commercially available, include SE 30 silicone gum and SF96 silicone fluid available from the General Electric Company. Similar materials can also be obtained from Dow Corning and from Wacker Silicones.

An additional fluid diorganosiloxane-based polymer optionally for use in the present invention is a dimethicone copolyol. The dimethicone copolyol can be further characterized as polyalkylene oxide modified polydimethysiloxanes, such as manufactured by the Witco Corporation under the trade name Silwet. Similar materials can be obtained from Dow Corning, Wacker Silicones and Goldschmidt Chemical Corporation as well as other silicone manufacturers. Silicones useful herein are further disclosed in U.S. Pat. Nos. 5,059,282; 5,164,046; 5,246,545; 5,246,546; 5,552,345; 69238,682; 5,716,692.

The chemical softening agents are generally useful at a level of from about 0.05 lbs/ton to about 300 lbs/ton, in another embodiment from about 0.2 lbs/ton to about 60 lbs/ton, and in another embodiment from about 0.4 lbs/ton to about 6 lbs/ton. In addition antibacterial agents, coloring agents such as print elements, perfumes, dyes, and mixtures thereof, may be included in the fibrous structure product of the present invention.

EXAMPLES

Example 1

One fibrous structure useful in achieving the fibrous structure paper products of the present invention is a through-air-dried (TAD), differential density structure formed by the following process. (Examples of TAD structures are generally described in U.S. Pat. No. 4,528,239.)

A Fourdrinier, through-air-dried papermaking machine is used. A slurry of papermaking fibers is pumped to the headbox at a consistency of about 0.15%. The slurry consists of about 70% Northern Softwood Kraft fibers, about 30% unrefined Eucalyptus fibers, a cationic polyamine-epichlorohydrin wet burst strength resin at a concentration of about 25 lbs per ton of dry fiber, and carboxymethyl cellulose at a concentration of about 5 lbs per ton of dry fiber, as well as DTDMAMS at a concentration of about 6 lbs per ton of dry fiber.

Dewatering occurs through the Fourdrinier wire and is assisted by vacuum boxes. The embryonic wet web is transferred from the Fourdrinier wire at a fiber consistency of about 20% at the point of transfer, to a TAD carrier fabric. The wire speed is about 620 feet per minute. The carrier fabric speed is about 600 feet per minute. Since the wire speed is faster than the carrier fabric, wet shortening of the web occurs at the transfer point. Thus, the wet web foreshortening is about 3%. The sheet side of the carrier fabric consists of a continuous, patterned network of photopolymer resin, the pattern containing about 150 deflection conduits or domes per square inch. The deflection conduits or domes are arranged in a regular configuration, and the polymer network covers about 25% of the surface area of the carrier fabric. The polymer resin is supported by and attached to a woven support member. The photopolymer network rises about 18 mils above the support member.

The consistency of the web is about 60% after the action of the TAD dryers operating about a 400° F., before transfer onto the Yankee dryer. An aqueous solution of creping adhesive is applied to the Yankee surface by spray applicators before the location of the sheet transfer. The fiber consistency is increased to an estimated 95.5% before creping the web with a doctor blade. The doctor blade has a bevel angle of about 25 degrees and is positioned with respect to the Yankee dryer to provide an impact angle of about 81 degrees. The Yankee dryer is operated at about 360° F., and Yankee hoods are operated at about 350° F.

The dry, creped web is passed between two calendar rolls and rolled on a reel operated at 560 feet per minute so that there is about 7% foreshortening of the web by crepe.

The paper described above is then subjected to a knob-to-rubber impression embossing process as follows. An emboss roll is engraved with a nonrandom pattern of protrusions. The emboss roll is mounted, along with a backside impression roll, in an apparatus with their respective axes being generally parallel to one another. The emboss roll comprises embossing protrusions which are frustaconical in shape. The backside impression roll is made of Valcoat™ material from Valley Roller Company, Mansfield, Tex. The paper web is passed through the nip to create an embossed ply.

The resulting paper has a Wet Burst strength of 300 g, Basis Weight of about 34 lbs/3000 ft.$^2$ to about 36 lbs/3000 ft.$^2$, Compression slope of about 14, a Wet Caliper of about 31 mils, and a Flex Modulus of about 0.6, and an embossment height of from about 600 to about 950 μm.

Example 2

One fibrous structure useful in achieving the fibrous structure paper products of the present invention is a through-air-dried (TAD), differential density structure formed by the following process. (Examples of TAD structures are generally described in U.S. Pat. No. 4,528,239.)

A Fourdrinier, through-air-dried papermaking machine is used. A slurry of papermaking fibers is pumped to the headbox at a consistency of about 0.15%. The slurry consists of about 70% Northern Softwood Kraft fibers, about 20% unrefined Eucalyptus fibers, and about 10% of bicomponent fibers of copolymers of polyester (polyethylene terephthalate)/polyester (polyethylene terephthalate) such as "CoPET/PET" fibers, which are commercially available from Fiber Innovation Technology, Inc., Johnson City, Tenn. The slurry further comprises a cationic polyamine-epichlorohydrin wet burst strength resin at a concentration of about 25 lbs per ton of dry fiber, and carboxymethyl cellulose at a concentration of about 5 lbs per ton of dry fiber, as well as DTDMAMS at a concentration of about 6 lbs per ton of dry fiber.

Dewatering occurs through the Fourdrinier wire and is assisted by vacuum boxes. The embryonic wet web is transferred from the Fourdrinier wire at a fiber consistency of about 24% at the point of transfer, to a TAD carrier fabric. The wire speed is about 620 feet per minute. The carrier fabric speed is about 600 feet per minute. Since the wire speed is faster than the carrier fabric, wet shortening of the web occurs at the transfer point. Thus, the wet web foreshortening is about 3%. The sheet side of the carrier fabric consists of a continuous, patterned network of photopolymer resin, the pattern containing about 150 deflection conduits or domes per square inch. The deflection conduits or domes are arranged in a regular configuration, and the polymer network covers about 25% of the surface area of the carrier fabric. The polymer resin is supported by and attached to a woven support member. The photopolymer network rises about 18 mils above the support member.

The consistency of the web is about 72% after the action of the TAD dryers operating about a 350° F., before transfer onto the Yankee dryer. An aqueous solution of creping adhesive is applied to the Yankee surface by spray applicators before location of sheet transfer. The fiber consistency is increased to an estimated 97% before creping the web with a doctor blade. The doctor blade has a bevel angle of about 25 degrees and is positioned with respect to the Yankee dryer to provide an impact angle of about 81 degrees. The Yankee dryer is operated at about 500° F., and Yankee hoods are operated at about 380° F.

The dry, creped web is passed between two calendar rolls and rolled on a reel operated at 560 feet per minute so that there is about 7% foreshortening of the web by crepe.

The paper described above is then subjected to a knob-to-rubber impression embossing process as follows. An emboss roll is engraved with a nonrandom pattern of protrusions. The emboss roll is mounted, along with a backside impression roll, in an apparatus with their respective axes being generally parallel to one another. The emboss roll comprises embossing protrusions which are frustaconical in shape. The backside impression roll is made of Valcoat™ material from Valley Roller Company, Mansfield, Tex. The paper web is passed through the nip to create an embossed ply.

The resulting paper has a Wet Burst strength of 310 g, Basis Weight of about 35 lbs/3000 ft$^2$, Compression Slope of about 20, a Wet Caliper of about 29 mils, Flex Modulus of about 0.5, and an embossment height of from about 600 to about 950 μm.

Test Methods

The following describe the test methods utilized herein to determine the values consistent with those presented herein. All measurements for the test methods are made at 23+/−1° C. and 50% +/−2% relative humidity, unless otherwise specified.

Flex Modulus

The Flex Modulus is a measurement of the bending stiffness of the fibrous structure product herein. The following procedure can be used to determine the bending stiffness of paper product. The Kawabata Evaluation System-2, Pure Bending Tester (i.e.; KES-FB2, manufactured by a Division of Instrumentation, Kato Tekko Company, Ltd. of Kyoto, Japan) may be used for this purpose.

Samples of the paper product to be tested are cut to approximately 20×20 cm in the machine and cross machine direction. The sample width is measured to 0.01 inches (0.025 cm). The outer ply (i.e.; the ply that is facing outwardly on a roll of the paper sample) and inner ply as presented on the roll are identified and marked.

The sample is placed in the jaws of the KES-FB2 Auto A such that the sample is first bent with the outer ply undergoing compression and the inner ply undergoing tension. In the orientation of the KES-FB2 the outer ply is right facing and the inner ply is left facing. The distance between the front moving jaw and the rear stationary jaw is 1 cm. The sample is secured in the instrument in the following manner. First the front moving chuck and the rear stationary chuck are opened to accept the sample. The sample is inserted midway between the top and bottom of the jaws such that the machine direction of the sample is parallel to the jaws (i.e.; vertical in the KES-FB2 holder).

The rear stationary chuck is then closed by uniformly tightening the upper and lower thumb screws until the sample is snug, but not overly tight. The jaws on the front stationary chuck are then closed in a similar fashion. The sample is adjusted for squareness in the chuck, then the front jaws are tightened to insure the sample is held securely. The distance (d) between the front chuck and the rear chuck is 1 cm.

The output of the instrument is load cell voltage (Vy) and curvature voltage (Vx). The load cell voltage is converted to a bending moment normalized for sample width (M) in the following manner:

Moment (M, gf*cm/cm)=(Vy*Sy*d)/W where Vy is the load cell voltage; Sy is the instrument sensitivity in gf*cm/V; d is the distance between the chucks; and W is the sample width in centimeters.

The sensitivity switch of the instrument is set at 5×1. Using this setting the instrument is calibrated using two 50 gram weights. Each weight is suspended from a thread. The thread is wrapped around the bar on the bottom end of the rear stationary chuck and hooked to a pin extending from the front and back of the center of the shaft. One weight thread is wrapped around the front and hooked to the back pin. The other weight thread is wrapped around the back of the shaft and hooked to the front pin. Two pulleys are secured to the instrument on the right and left side. The top of the pulleys are horizontal to the center pin. Both weights are then hung over the pulleys (one on the left and one on the right) at the same time. The full scale voltage is set at 10 V. The radius of the center shaft is 0.5 cm. Thus the resultant full scale sensitivity (Sy) for the Moment axis is 100 gf*0.5 cm/10V (5 gf*cm/V).

The output for the Curvature axis is calibrated by starting the measurement motor and manually stopping the moving chuck when the indicator dial reaches the stop. The output voltage (Vx) is adjusted to 0.5 volts. The resultant sensitivity (Sx) for the curvature axis is 2/(volts*cm). The curvature (K) is obtained in the following manner:

Curvature (K, $cm^{-1}$)=Sx*Vx where Sx is the sensitivity of the curvature axis; and Vx is the output voltage.

For determination of the bending stiffness the moving chuck is cycled from a curvature of 0 $cm^{-1}$ to +2.5 $cm^{-1}$ to −2.5 $cm^{-1}$ to 0 $cm^{-1}$ at a rate of 0.5 $cm^{-1}$/sec. Each sample is cycled once. The output voltage of the instrument is recorded in a digital format using a personal computer. At the start of the test there is no tension on the sample. As the test begins the load cell begins to experience a load as the sample is bent. The initial rotation is clockwise when viewed from the top down on the instrument.

The load continues to increase until the bending curvature reaches approximately +2.5 $cm^{-1}$ (this is the Forward Bend (FB)). At approximately +2.5 $cm^{-1}$ the direction of rotation was reversed. During the return the load cell reading decreases. This is the Forward Bend Return (FR). As the rotating chuck passes 0, curvature begins in the opposite direction. The Backward Bend (BB) and Backward Bend Return (BR) is obtained.

The data was analyzed in the following manner. A linear regression line is obtained between approximately 0.2 and 0.7 $cm^{-1}$ for the Forward Bend (FB). The slope of the line is reported as the Bending Stiffness (B) or Flex Modulus, in units of gf*$cm^2$ /cm. The method is repeated with the sample oriented such that the cross direction is parallel to the jaws. Three or more separate samples are run. The reported values are the averages of the BFB on the MD and CD samples. This method is also described in U.S. Pat. No. 6,602,577B1.

Sheet Caliper or Loaded Caliper Test Method

Samples are conditioned at 23+/−1° C. and 50%+/−2% relative humidity for two hours prior to testing.

Sheet Caliper or Loaded Caliper of a sample of fibrous structure product is determined by cutting a sample of the fibrous structure product such that it is larger in size than a load foot loading surface where the load foot loading surface has a circular surface area of about 3.14 in 2. The sample is confined between a horizontal flat surface and the load foot loading surface. The load foot loading surface applies a confining pressure to the sample of 14.7 g/$cm^2$ (about 0.21 psi). The caliper is the resulting gap between the flat surface and the load foot loading surface. Such measurements can be obtained on a VIR Electronic Thickness Tester Model II available from Thwing-Albert Instrument Company, Philadelphia, Pa. The caliper measurement is repeated and recorded at least five (5) times so that an average caliper can be calculated. The result is reported in mils.

Wet Caliper Test Method

Samples are conditioned at 23+/−1° C. and 50% relative humidity for two hours prior to testing.

Wet Caliper of a sample of fibrous structure product is determined by cutting a sample of the fibrous structure product such that it is larger in size than a load foot loading surface where the load foot loading surface has a circular surface area of about 3.14 $in^2$. Each sample is wetted by submerging the sample in a distilled water bath for 30 seconds. The caliper of the wet sample is measured within 30 seconds of removing the sample from the bath. The sample is then confined between a horizontal flat surface and the load foot loading surface. The load foot loading surface applies a confining pressure to the sample of 14.7 g/$cm^2$ (about 0.21 psi). The caliper is the resulting gap between the flat surface and the load foot loading surface. Such measurements can be obtained on a VIR Electronic Thickness Tester Model II available from Thwing-Albert Instrument Company, Philadelphia, Pa. The caliper measurement is repeated and recorded at least five (5) times so that an average caliper can be calculated. The result is reported in mils.

High Load Caliper and Compression Slope

Caliper versus load data are obtained using a Thwing-Albert Model EJA Materials Tester, equipped with a 2000 g load cell and compression fixture. The compression fixture consisted of the following; load cell adaptor plate, 2000 gram overload protected load cell, load cell adaptor/foot mount 1.128 inch diameter presser foot, #89-14 anvil, 89-157 leveling plate, anvil mount, and a grip pin, all available from Thwing-Albert Instrument Company, Philadelphia, Pa. The compression foot is one square inch in area. The instrument is run under the control of Thwing-Albert Motion Analysis Presentation Software (MAP V1,1,6,9). A single sheet of a conditioned sample is cut to a diameter of approximately two inches. Samples are conditioned for a minimum of 2 hours at 23+/−1° C. and 50±2% relative humidity. Testing is carried out under the same temperature and humidity conditions. The sample must be less than 2.5-inch diameter (the diameter of the anvil) to prevent interference of the fixture with the sample. Care should be taken to avoid damage to the center portion of the sample, which will be under test. Scissors or other cutting tools may be used. For the test, the sample is centered on the compression table under the compression foot. The compression and relaxation data are obtained using a crosshead speed of 0.1 inches/minute. The deflection of the load cell is obtained by running the test without a sample being present. This is generally known as the Steel-to-Steel data. The Steel-to-Steel data are obtained at a crosshead speed of 0.005 in/min. Crosshead position and load cell data are recorded between the load cell range of 5 grams and 1500 grams for both the compression and relaxation portions of the test. Since the foot area is one square inch this corresponded to a range of 5 grams/sq in to 1500 grams/sq in. The maximum pressure exerted on the sample is 1500 g/sq in. At 1500 g/sq in the crosshead reverses its travel direction. Crosshead position values are collected at 31 selected load values during the test. These correspond to pressure values of 10, 25, 50, 75, 100, 125, 150, 200, 300, 400, 500, 600, 750, 1000, 1250, 1500, 1250, 1000, 750, 500, 400, 300, 250, 200, 150, 125, 100, 75, 50, 25, 10 g/sq. in. for the compression and the relaxation direction. During the compression portion of the test, crosshead position values are collected by the MAP software, by defining fifteen traps (Trap1 to Trap 15) at load settings of 10, 25, 50, 75, 100, 125, 150, 200, 300, 400, 500, 600, 750, 1000, 1250. During the return portion of the test, crosshead position values are collected by the MAP software, by defining fifteen return traps (Return Trap1 to Return Trap 15) at load settings of 1250, 1000, 750, 500, 400, 300, 250, 200, 150, 125, 100, 75, 50, 25, 10. The thirty-first trap is the trap at max load (1500 g). Again values are obtained for both the Steel-to-Steel and the sample. Steel-to-Steel values are obtained for each batch of testing. If multiple days are involved in the testing, the values are checked daily. The Steel-to-Steel values and the sample values are an average of four replicates (1500 g).

Caliper values are obtained by subtracting the average Steel-to-Steel crosshead trap values from the sample crosshead trap value at each trap point. For example, the values from two, three, or four individual replicates on each sample are averaged and is used to obtain plots of the Caliper versus Load and Caliper versus Log(10) Load.

The Compression Slope is defined as the absolute value of the initial slope of the caliper versus Log(10)Load. The value is calculated by taking four data pairs from the compression direction of the curve that is, the caliper at 500, 600, 750, 1,000 or 750, 1,000, 1250, 1500, g/sq in at the start of the test. The pressure is converted to the Log(10) of the pressure. A least square regression is then obtained using the four pairs of caliper (y-axis) and Log(10) pressure (x-axis). The absolute value of the slope of the regression line is the Compression Slope. The units of the Compression Slope are mils/(log(10) g/sq in). For simplicity the Compression Slope is reported here without units. High Load Caliper is the average caliper at 1,500 g/sq. inch.

Wet Burst Strength Test Method

"Wet Burst Strength" as used herein is a measure of the ability of a fibrous structure and/or a fibrous structure product incorporating a fibrous structure to absorb energy, when wet and subjected to deformation normal to the plane of the fibrous structure and/or fibrous structure product.

Wet burst strength may be measured using a Thwing-Albert Burst Tester Cat. No. 177 equipped with a 2000 g load cell commercially available from Thwing-Albert Instrument Company, Philadelphia, Pa.

Wet burst strength is measured by taking two (2) multi-ply fibrous structure product samples. Using scissors, cut the samples in half in the MD so that they are approximately 228 mm in the machine direction and approximately 114 mm in the cross machine direction, each two (2) plies thick (you now have 4 samples). First, condition the samples for two (2) hours at a temperature of 73° F.±2° F. (about 23° C.±1° C.) and a relative humidity of 50%±2%. Next age the samples by stacking the samples together with a small paper clip and "fan" the other end of the stack of samples by a clamp in a 105° C. (±1° C.) forced draft oven for 5 minutes (±10 seconds). After the heating period, remove the sample stack from the oven and cool for a minimum of three (3) minutes before testing. Take one sample strip, holding the sample by the narrow cross machine direction edges, dipping the center of the sample into a pan filled with about 25 mm of distilled water. Leave the sample in the water four (4) (±0.5) seconds. Remove and drain for three (3) (±0.5) seconds holding the sample so the water runs off in the cross machine direction. Proceed with the test immediately after the drain step. Place the wet sample on the lower ring of a sample holding device of the Burst Tester with the outer surface of the sample facing up so that the wet part of the sample completely covers the open surface of the sample holding ring. If wrinkles are present, discard the samples and repeat with a new sample. After the sample is properly in place on the lower sample holding ring, turn the switch that lowers the upper ring on the Burst Tester. The sample to be tested is now securely gripped in the sample holding unit. Start the burst test immediately at this point by pressing the start button on the Burst Tester. A plunger will begin to rise toward the wet surface of the sample. At the point when the sample tears or ruptures, report the maximum reading. The plunger will automatically reverse and return to its original starting position. Repeat this procedure on three (3) more samples for a total of four (4) tests, i.e., four (4) replicates. Report the results as an average of the four (4) replicates, to the nearest g.

All measurements referred to herein are made at 23+/−1° C. and 50% relative humidity, unless otherwise specified.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A multiply fibrous structure product comprising:

two or more plies of fibrous structure wherein the fibrous structure has a Compression Slope from [about 11] *12* to about 30; a basis weight from [about 26] *28* lbs/3000 $ft^2$ to about 50 lbs/3000 $ft^2$; a Wet Caliper of greater than about 18 mils; and a Flex Modulus from about 0.1 to about 0.8.

2. The product of claim 1 wherein the Compression Slope is from about 12 to about 25.

3. The product of claim 1 wherein the basis weight is from 27 lbs/3000 $ft^2$ to about 40 lbs/3000 $ft^2$.

4. The product of claim 3 wherein the basis weight is from 30 lbs/3000 $ft^2$ and about 40 lbs/3000 $ft^2$.

5. The product of claim 1 wherein the Flex Modulus is from about 0.2 to about 0.75.

6. The product of claim 5 wherein the Flex Modulus is from about 0.3 to about 0.7.

7. The product of claim 1 wherein at least one of the plies comprises a plurality of domes formed during the papermaking process wherein the ply comprises from about 10 to about 1000 domes per square inch of the ply.

8. The product of claim 7 wherein the ply comprises from about 50 to about 300 domes per square inch of the ply.

9. The product of claim 7 wherein the fibrous substrate comprises from about 8% to about 60% of eucalyptus fibers.

10. The product of claim 7 further comprising a sheet caliper of at least about 29 mils.

11. The product of claim 10 wherein the sheet caliper is from about 30 mils to about 50 mils.

12. The product of claim 11 wherein the sheet caliper of from about 33 mils to about 45 mils.

13. The product of claim 7 wherein at least one of the plies is selected from the group consisting of: creped or uncreped through-air-dried fibrous structure plies, differential density fibrous structure plies, wet laid fibrous structure plies, air laid fibrous structure plies, conventional wet-pressed fibrous structure plies and mixtures thereof.

14. The product of claim 13 wherein the ply comprises a creped through-air dried paper.

15. The product of claim 1 wherein the Wet Caliper is from about 22 mils to about 35 mils.

16. The product of claim 15 wherein the Wet Caliper is from about 28 mils to about 30 mils.

17. The product of claim 1 wherein the fibrous structure product further comprises a chemical softening agent at a level from about 0.05 lbs/ton to about 6 lbs/ton, of furnish.

18. The product of claim 17 wherein the chemical softening agent is selected from the group consisting of quaternary ammonium compounds, organo-reactive polydimethyl siloxane compounds, and mixtures thereof.

19. The product of claim 18 wherein the chemical softening compound is selected from the group consisting of dialkyldimethylamnmonium salts, ditallowdimethylammonium chloride, ditallowdimethylammonium methyl sulfate, di(hydrogenated tallow)dimethyl ammonium chloride, mono or diester variations of the dialkyldimethylammonium, and mixtures thereof.

20. The product of claim 1 wherein at least one of the plies has a plurality of embossments.

21. The product of claim 1 wherein only one of the plies has a plurality of embossments.

22. The product of claim 1 wherein the product is two ply wherein both plies comprise a plurality of embossments.

23. A fibrous structure product comprising:

one ply of fibrous structure wherein the fibrous structure has a Compression Slope from about 11 to about 30; a basis weight from about 28 lbs/3000 $ft^2$ to about 50 lbs/3000 $ft^2$; a Wet Caliper from about 18 mils to about 40 mils; and a Flex Modulus from about 0.1 to about 0.8.

24. The product of claim 23 wherein the Compression Slope is from about 12 to about 25.

25. The product of claim 23 wherein the basis weight is from 27 lbs/3000 $ft^2$ to about 40 lbs/3000 $ft^2$.

26. The product of claim 25 wherein the basis weight is from 30 lbs/3000 $ft^2$ and about 40 lbs/3000 $ft^2$.

27. The product of claim 23 wherein the Flex Modulus is from about 0.2 to about 0.75.

28. The product of claim 27 wherein the Flex Modulus is from about 0.3 to about 0.7.

29. The product of claim 23 comprising a plurality of domes formed during the papermaking process wherein the ply comprises from about 10 to about 1000 domes per square inch of the ply.

30. The product of claim 29 wherein the ply comprises from about 50 to about 300 domes per square inch of the ply.

31. The product of claim 23 wherein the fibrous substrate comprises from about 8% to about 60% of eucalyptus fibers.

32. The product of claim 23 wherein the Wet Caliper is from about 22 mils to about 3 mils.

33. The product of claim 32 wherein the Wet Caliper is from about 28 mils to about 30 mils.

34. The product of claim 23 further comprising a sheet caliper of at least about 29 mils.

35. The product of claim 34 wherein the sheet caliper is from about 30 mils to about 50 mils.

36. The product of claim 35 wherein the sheet caliper of from about 33 mils to about 45 mils.

37. The product of claim 23 wherein the fibrous structure product further comprises a chemical softening agent at a level from about 0.05 lbs/ton to about 6 lbs/ton, of furnish.

38. The product of claim 23 wherein the ply is selected from the group consisting of: creped or uncreped through-air-dried fibrous structure ply, differential density fibrous structure ply, wet laid fibrous structure ply, air laid fibrous structure ply, or conventional wet-pressed fibrous structure ply.

39. The product of claim 38 wherein the ply comprises a creped through-air dried paper.

40. The product of claim 23 comprising a plurality of embossments.

* * * * *